United States Patent [19]

Chalmers

[11] 4,343,560

[45] Aug. 10, 1982

[54] SPIGOT JOINT

[76] Inventor: Wallace G. Chalmers, 2 Gloucester St., Suite 214, Toronto, Ontario, Canada, M4Y 1L5

[21] Appl. No.: 171,651

[22] Filed: Jul. 23, 1980

[30] Foreign Application Priority Data

Mar. 26, 1980 [CA] Canada .................................. 348350

[51] Int. Cl.[3] .......................... B25G 3/00; F16D 1/00; F16G 11/00

[52] U.S. Cl. ...................................... 403/13; 403/187; 403/201; 403/227

[58] Field of Search ................... 403/13, 14, 187, 201, 403/261, 287, 292, 293, 225–228, 220

[56] References Cited

U.S. PATENT DOCUMENTS

| | | | |
|---|---|---|---|
| 2,740,650 | 4/1956 | Hutton | 403/228 X |
| 3,069,185 | 12/1962 | Holmstrom | 280/713 |
| 3,287,863 | 11/1966 | Field | 51/375 |
| 4,264,230 | 4/1981 | van der Minden | 403/261 X |

FOREIGN PATENT DOCUMENTS

| | | | |
|---|---|---|---|
| 604782 | 9/1960 | Canada . | |
| 958729 | 12/1974 | Canada . | |
| 1068734 | 12/1979 | Canada . | |
| 2301337 | 7/1974 | Fed. Rep. of Germany | 403/13 |
| 490804 | 8/1938 | United Kingdom . | |
| 619618 | 3/1949 | United Kingdom . | |
| 1489338 | 10/1977 | United Kingdom . | |

*Primary Examiner*—Wayne L. Shedd
*Attorney, Agent, or Firm*—Cushman, Darby & Cushman

[57] ABSTRACT

A spigot assembly for attaching a knuckle of a vehicle to a relatively movable part of the vehicle by way of a bushing having a bore and ends adapted to be held within the knuckle. The major parts of the assembly include a spigot having a base arranged to be rigidly secured to the vehicle part and a tubular projection extending from the base. The projection includes an outer end defining a first annular surface facing axially outwardly of the projection. A tubular cap is provided having on its inner end a second annular surface and engageable in abutting relation with the first annular surface of the projection. A centering and aligning means is located at the inner end of the cap to ensure registry of the first and second annular surfaces. Bolt means is receivable in the aligned spigot and cap parts in coaxial relation therewith for fastening the spigot and cap parts tightly together with the first and second annular surfaces engaged with one another and with the centering and aligning means arranged to take up the bolt forces and transmit them to the aligned annular surfaces. These first and second annular surfaces serve to transmit any bending moments applied by the bushing to the cap part directly to the spigot part so that the bolt means is not subjected to bending stresses.

10 Claims, 3 Drawing Figures

3 3 16 12 10 25

SPIGOT JOINT

The present invention relates to improved means for locating the end of a link of a vehicle suspension or steering system. More specifically, the invention provides an improved spigot assembly for attaching the knuckle of a vehicle suspension member to a relatively movable part of the vehicle, and has particular application to torque rods and radius rods used in vehicle suspension systems.

Many vehicle suspension systems have members which transmit tension or compression between relatively movable parts. Such members usually have a knuckle at one end surrounding a generally cylindrical bushing which is located by a spigot or pin connected to the parts to be located the assembly allowing pivoting of the member about the pin or spigot.

As an example, my prior Canadian Pat. No. 958,729, issued Dec. 3, 1974, shows vehicle suspensions having lower torque rods connected to suspension parts by various means. An example of a spigot type, or single ended type connection is shown in FIG. 3 of this prior patent, the spigot being of a projecting part of a hollow pin which has a hardened chrome finish with a smooth machined and polished surface, and which is held within an accurately machined bore within a suspension part. The pin receives a hollow bushing held within the knuckle end of a torque rod, which is held on the pin by a washer and a transverse screw. Another arrangement is shown in FIG. 9 of this patent, where the end of a torque rod is held in a clevis in part by a hollow pin which is also hardened and machined, and with a polished surface, and which fits within accurately machined bores in the sides of the clevis, being retained in place by a screw.

These constructions of my prior patent are relatively expensive in that they necessitate machining and plating of the pins and machining of the bores into which they fit, since the pins must fit with very close tolerance within the bores to avoid any slackness. The provision of transverse bores for the retaining bolts also adds to the expense.

My Canadian Pat. No. 1,068,734 issued Dec. 25, 1979, describes an improved spigot assembly for attaching the knuckle of a vehicle suspension member to a relatively movable part of the vehicle which includes a spigot part and a cap part, arranged to be held together by bolt means. The spigot part has a base arranged to be rigidly secured to the vehicle part and has a generally cylindrical projection and an annular bearing surface extending outwardly from the foot of the projection, the projection also having frusto-conical surface coaxial with its cylindrical surface and facing axially outwardly of the projection. The cap part also has a frusto-conical surface, which is complementary to and engagable with that of the spigot part, and the cap part also has an annular bearing surface coaxial with its frusto-conical surface and which faces the bearing surface of the spigot part when the two parts have their frusto-conical surfaces engaged. The spigot and cap parts both have axial bores for receiving the bolt means, and the parts, when fastened together, are suitable for locating a bushing held by the knuckle of the suspension member.

The above described structure has been found to be cheaper in manufacture and assembly than that of the earlier patent and those previously in general use and it has been furthermore found that the parts of the above assembly can be removed and replaced with relative ease. Furthermore, the above described assembly makes possible the use of as-cast surfaces enabling machining and plating costs to be substantially avoided. However, although the above described arrangement has been found to be a substantial improvement over the prior art, the need for a still further improved assembly has been demonstrated. For example, although the frusto-conical surfaces described in the above copending application substantially eliminate the need for machining, it has been found that under stress and with commercial tolerances, there is sometimes a slight tendency for the cap portion to rock slightly or to wobble relative to the spigot part thus resulting in undesirable bending stresses in the connecting bolt. There is accordingly a need to provide an improved assembly which ensures that the connecting bolt is only subjected to pure tensile loadings. There is also a need to provide a spigot and cap configuration which provides for radial compression and preloading of the rubber bushing upon assembly. It has also been found that there is a need to provide a spigot assembly which is somewhat easier to assemble and disassemble than in the previous arrangement. It is also considered highly desirable to provide a spigot and cap assembly which can be manufactured more economically by simple metal forming techniques such as stamping or metal spinning techniques.

Accordingly the present invention provides for an improved spigot assembly for attaching a knuckle of a vehicle to a relatively movable part of the vehicle by way of a bushing having a bore and ends adapted to be held within the knuckle. The major parts of the assembly include a spigot having a base arranged to be rigidly secured to the vehicle part and a tubular projection extending from the base. The projection includes an outer end defining a first annular surface facing axially outwardly of the projection. A tubular cap is provided having on its inner end a second annular surface and engageable in abutting relation with the first annular surface of the projection. A centering and aligning means is located at the inner end of the cap to ensure registry of the first and second annular surfaces. Bolt means is receivable in the aligned spigot and cap parts in coaxial relation therewith for fastening the spigot and cap parts tightly together with the first and second annular surfaces engaged with one another and with the centering and aligning means arranged to take up the bolt forces and transmit them to the aligned annular surfaces. These first and second annular surfaces serve to transmit any bending moments applied by the bushing to the cap part directly to the spigot part so that the bolt means is not subjected to bending stresses.

In a further aspect the centering and aligning means comprises a disc secured in the inner end of the tubular cap and projecting outwardly of said inner end, the disc having a central aperture to receive the bolt means.

Preferably the disc has an annular frusto-conical outer surface which enters into the outer end of the tubular spigot to effect said aligning and centering.

In a further aspect the first and second annular surfaces are arranged such that contact between them takes place along a line of contact having the greatest possible diameter common to the two annular surfaces thereby to reduce the possibility of the cap rocking relative to the spigot under the influence of lateral forces.

In a typical embodiment of the invention, the spigot and the cap together define outer surfaces coaxial with the axis of the bolt means, with each of the spigot and cap parts further each having an annular flange extending outwardly of and coaxial with said outer surface and arranged such that in use, with the spigot and cap parts fastened together, the outer surfaces and the annular flanges engage the bore and ends respectively of the bushing which is held within the knuckle thereby to securely locate the bushing.

In a preferred feature of the invention, the outer surfaces on the projection and cap parts are tapered inwardly in directions away from their associated annular flanges so that as the two parts are brought together, as during assembly thereof, the rubber bushing becomes compressed (particularly in a radial direction) between the outer surfaces of such parts and the knuckle.

Preferably, the outer surfaces of the projection and cap parts are of substantially equal axial extents.

The projection and cap parts are preferably made from steel stampings although both can be spun for small production quantities. By virtue of the structure broadly described above, no machining of the mating surfaces is necessary in order to provide a secure and stable structure.

A preferred embodiment of the invention will be described in detail with reference being had to the accompanying drawings in which.

As noted previously, the present invention finds use in various forms of suspension systems, which systems involve use of torque rods or like members to provide an interconnection between the vehicle frame and a relatively movable part of the suspension.

Figure 1:
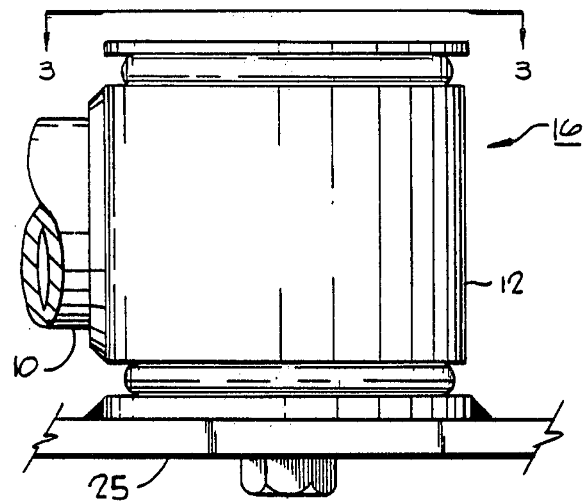
FIG. 1 is a diagrammatic plan view showing a small part of a suspension assembly utilizing the spigot assembly of the invention.
Figure 2:
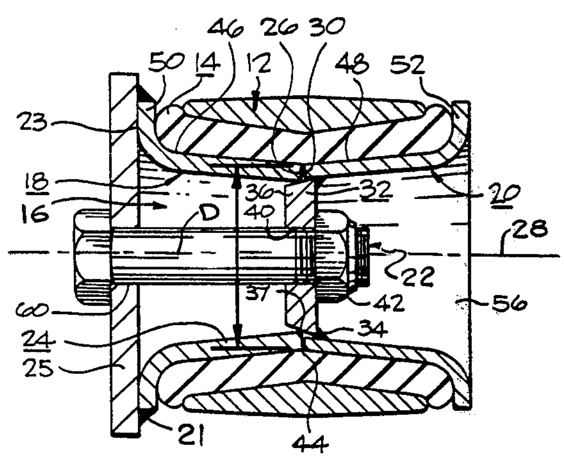
FIG. 2 is a section view taken along line 2—2 in FIG. 3.
Figure 3:
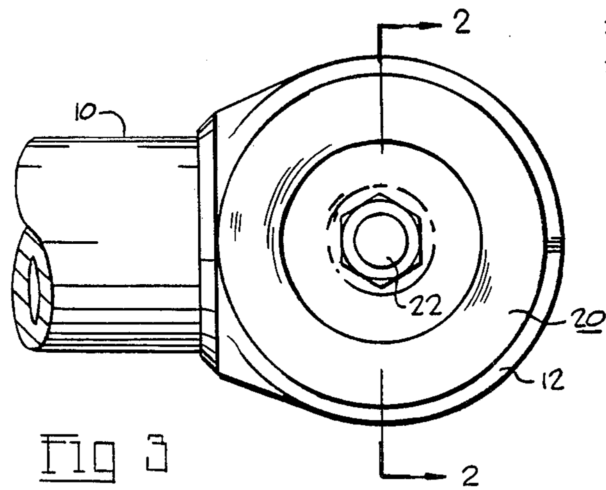
FIG. 3 is an end elevation view of the structure illustrated in FIG. 2.

FIG. 1 shows a small part of a suspension assembly incorporating a spigot assembly according to the invention and includes an elongated rod 10 having at its end an enlarged eye or knuckle 12 in the form of a short cylinder transverse to the rod, and having a bore which is of convergent-divergent form as shown in FIG. 2 and which is cast on the end of the rod 12, such knuckle ordinarily requiring no machining. Into this bore is inserted a resilient elastomeric bushing 14, preferably of rubber, having an outer shape conforming to that of the transverse bore. The inner surface of bushing 14 is located by the improved spigot assembly generally indicated by reference 16.

Referring to FIG. 2, the spigot assembly is shown as including, basically, a tubular spigot 18, a tubular cap 20, and an axially disposed bolt 22 which holds the two parts together.

It will be seen that the spigot 18 is a hollow tubular member having a flat outwardly flared base 23 which, as shown in FIG. 2, may be attached by weld 21 to a chassis member 25. A hollow tubular projection 24 extends outwardly from base 23, the projection 24 being of circular cross-section.

The projection 24 includes an outer end defining a first annular surface 26 facing axially outwardly of the projection and being normal to the axis of symmetry 28 of the assembly. The cap 20 is also provided with a second annular surface 30 which is generally the same diameter as and arranged to engage the first annular surface 26 of the spigot.

A disc 32 is secured by annular weld 34 in the inner end of the cap, such disc 32 projecting outwardly of the end of the cap and having a frusto-conical annular outer surface 36 arranged to enter into the outer end of the projection 24 thereby to accurately align the spigot and cap and assist in holding their associated annular surfaces 26 and 30 in co-axial relationship.

The wall of the spigot 18 is shown as thicker than the wall of the cap primarily for purposes of strength but also to provide an annular step 37 which serves to cooperate with the disc 32 in connection with the centering functions referred to above. However, by effecting minor changes to the structure, the thicknesses of the cap and the spigot may be made equal.

The disc 32 has a central aperture 40 through which the bolt 22 passes. The nut 42 on the bolt bears against disc 32 so that the latter transmits the bolt forces ultimately to the spigot 18. The axial position of the disc 32 relative to the cap 20 is preferably chosen so that the bolt forces are transmitted to the spigot solely by way of the contacting annular surfaces 26, 30. The annular surfaces 26, 30 are also preferably sloped slightly so that they each are of a shallow frusto-conical annular shape with the surfaces being sloped toward each other such that contact between them takes place along a circular line of contact 44 having the greatest possible diameter common to the two annular surfaces. The diameter of the line of contact is given by the arrowed line "D" in FIG. 2. This large diameter single line of contact virtually eliminates any possibility of the cap 20 rocking relative to the spigot 18 under the influence of lateral forces on the cap.

With continued reference to FIG. 2, both the spigot 18 and the cap 20 are provided with respective outer surfaces 46 and 48 coaxial with axis 28. Each of the spigot and cap 18 and 20 further include respective annular flanges 50 and 52 extending outwardly of and coaxial with their associated outer surfaces 46 and 48 and arranged so that, in use of the spigot assembly with the parts 18 and 20 fastened together by bolt 22, the outer surfaces 46, 48, and the annular flanges 50, 52, engage the bore and ends respectively of the rubber bushing 14 held within the knuckle. It should also be noted that the above annular flange 50 serves to also define the above noted outwardly flaring base portion 23 which is welded to the frame member 25 although it will be realized that a separate base portion could be provided.

As a further feature, the outer surfaces 46 and 48 defined by the spigot and cap 18 and 20, are tapered inwardly (i.e. have gradually decreasing diameters) in directions inwardly from their annular flanges so that as the two parts 18 and 20 are brought together, as during assembly, the rubber bushing 14 becomes radially compressed between the outer surfaces 46 and 48 and the knuckle 12. In the embodiment illustrated the outer surfaces 46 and 48 of the spigot and cap are of substantially equal axial extent.

It will also be noted that with the bolt 22 in position as shown in FIG. 2, the nut 42 as well as the threads of the bolt are disposed deep within the recess 56 defined by the tubular cap thus protecting the nut and the bolt threads from damage as well as allowing the bolt to be kept short.

The above described arrangement is very simple to install. Firstly the spigot 18 is welded around the periphery of base 23 (as defined by flange 50) with a suitable aperture 60 being provided in the frame member 25 through which bolt 22 can be passed. The knuckle 12 with a bushing 14 therein is then located on the projection 24 of the spigot, as shown in FIG. 2, and the cap 20 is then placed in position also as shown in FIG. 2. The nut is then put in place on bolt 22 and tightened until the complementary annular surfaces 26, 30 are drawn tightly together along contact line 44. Although both the spigot and cap are in an as stamped condition, so that the above annular surfaces 26, 30 do not come together exactly all along contact line 44, nevertheless it has been found that they mate sufficiently well for the two parts to be held in secure alignment with one another.

The rubber bushing 14 is dimensioned so that when held by the knuckle 12 and axially uncompressed, it can slide easily onto the spigot projection 24 and cap 20 easily inserted into it. However, when the spigot and cap are drawn together by bolt means 22, the bushing 14 is both axially and radially compressed to such a degree that the bushing does not normally slide relative to these surfaces but is sufficiently deformable to allow the normal movements in the suspension without sliding. However, unusually large movements will allow the rubber to slip until it reaches a neutral position.

For replacing the bushings in a torque rod, all that is required is removal of the nut from bolt 22 whereupon the rod and cap 20 are removed and the knuckle replaced with a new bushing. There is usually sufficient spring in the rubber bushing for the spigot assembly to be tightened up completely at one end, while the other end of the torque rod remains to be sprung onto its spigot. Preferably however, the ends of the torque rod are placed on the respective spigots before any tightening takes place.

The above described embodiment possesses a substantial number of advantages. Metal stampings or spun metal parts may be used, and the necessity for machining or finishing of parts is eliminated thus reducing substantially the manufacturing costs involved.

Both the spigot and cap are hollow thus saving material costs and weight while providing for adequate strength. The relatively generous exterior dimensions minimize the pressure on the rubber bushings.

The spigot projection is only about half the length of the completed assembly. Upon removal of the cap, the torque rod or link only has to be moved about half the bushing length to allow it to come off the spigot. This provides for ease of assembly or disassembly particularly when one is working with relatively short torque rods. The taper on the spigot projection also assists in the disassembly.

The tapered external surfaces of the spigot and cap, which complement the interior surfaces of the bushing, result in radial compression and loading of the bushing upon assembly.

By virtue of the contacting annular surfaces, the connecting bolt is only subjected to tensile loadings. The large diameter line of contact allows all of the bending moments to be taken up by the cap and spigot. Therefore much smaller bolt diameters can be used thus resulting in less weight and less cost. The bolt can usually be of a common commercially available variety and not of a special construction as is often required in cases where the bolt is subjected to substantial bending or shearing loads.

The dimensions and tolerances of the spigot, the cap, and the rubber bushings, control the amount of precompression of the rubber bushing. The human element is eliminated and accordingly the bushing cannot be over-tightened or crushed.

The assembly is relatively compact. There is no need for a fastener, i.e. a nut, extending beyond the end of the spigot joint and the bolt threads and nut are fully protected. This is particularly important in the case of heavy equipment. Another feature is that the design permits different materials for the different parts.

I claim:

1. A spigot assembly for attaching a knuckle of a member of a vehicle to a relatively movable part of the vehicle via a bushing, the bushing having a bore and ends and being held within said knuckle, said spigot assembly comprising:

- a spigot having a base arranged to be rigidly secured to said vehicle part and a tubular projection extending from said base, said projection having an outer end defining a first annular surface facing axially outwardly of the projection;
- a tubular cap having on an inner end thereof a second annular surface in engagement with the first annular surface of said projection;
- a centering and aligning means being located at the inner end of said cap to ensure registry of the first and second annular surfaces and alignment of the spigot and cap along a common axis;
- bolt means extending within the aligned spigot and cap and fastening said spigot and cap together with said first and second annular surfaces tightly engaged with one another;
- the centering and aligning means taking up the bolt forces and transmitting them to the cap part; and
- said contacting first and second annular surfaces transmitting the bolt forces and any bending moments applied by the bushing to the cap part directly to the spigot part so that the bolt means is not subject to bending forces.

2. The spigot assembly of claim 1 wherein the centering and aligning means comprises a disc secured in the inner end of the tubular cap and projecting outwardly of said inner end, the disc having a central aperture to receive the bolt means.

3. The spigot assembly of claim 2 wherein the disc has an annular frusto-conical outer surface which enters into the outer end of the tubular spigot to effect said aligning and centering.

4. The spigot assembly of claim 1, 2 or 3 wherein the axial position of the disc is such that the bolt forces are transmitted by the cap to the spigot solely by way of the contacting annular surfaces.

5. The spigot assembly of claim 1, 2 or 3 wherein the first and second annular surfaces are coaxial and diverge from each other toward the axis such that contact between them takes place along a line of contact having the greatest possible diameter common to the two annular surfaces thereby to reduce the possibility of the cap rocking relative to the spigot under the influence of lateral forces.

6. The spigot assembly recited in claim 1, wherein at least one of said projection and said cap includes an outer surface coaxial with its pair of annular surfaces, each of said spigot and cap also having an annular flange extending outwardly of and coaxial with said outer surface and arranged so that, in use of the spigot assembly with said spigot and cap fastened together by said bolt means, said outer surface and annular flanges engage the bore and ends respectively of the bushing held within said knuckle to provide locating means for said bushing.

7. The spigot assembly recited in claim 6 wherein both said projection and cap include said outer surface, the outer surfaces defined by said spigot and cap being tapered inwardly in directions inwardly from their annular flanges so that as they are brought together, as during the assembly thereof, the rubber bushing becomes compressed between said outer surfaces and the knuckle.

8. The spigot assembly recited in claim 7 wherein the outer surfaces of said projection and cap are of substantially equal axial extents.

9. A spigot assembly as claimed in any of claims 1 to 8 wherein said spigot and cap are metal.

10. The spigot assembly recited in claim 7, 8 or 9 wherein the annular flange of the spigot part also serves to define said base which is secured to the vehicle part.

* * * * *

UNITED STATES PATENT AND TRADEMARK OFFICE

CERTIFICATE OF CORRECTION

PATENT NO. : 4,343,560

DATED : August 10, 1982

INVENTOR(S) : WALLACE G. CHALMERS

It is certified that error appears in the above—identified patent and that said Letters Patent is hereby corrected as shown below:

On the Title page:

"[30] Foreign Application Priority Data

Mar. 26, 1980 [CA] Canada...........348350" to

--[30] Foreign Application Priority Data

Mar. 26, 1980 [CA] Canada...........348450 --

Signed and Sealed this

*Fifth* Day of *October 1982*

[SEAL]

*Attest:*

GERALD J. MOSSINGHOFF

*Attesting Officer* *Commissioner of Patents and Trademarks*